US008004584B2

(12) United States Patent
Craig et al.

(10) Patent No.: US 8,004,584 B2
(45) Date of Patent: Aug. 23, 2011

(54) METHOD AND APPARATUS FOR THE CREATION OF COMPOUND DIGITAL IMAGE EFFECTS

(75) Inventors: Murray D. Craig, Johnstown, CO (US); Robert P. Cazier, Fort Collins, CO (US); Benjamin D. Kimbell, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1318 days.

(21) Appl. No.: 11/119,173

(22) Filed: Apr. 29, 2005

(65) Prior Publication Data

US 2006/0244845 A1    Nov. 2, 2006

(51) Int. Cl.
*H04N 5/262* (2006.01)
(52) U.S. Cl. .................................. 348/239; 348/231.3
(58) Field of Classification Search .................. 348/239, 348/571, 578, 589, 231.2, 231.3, 231.6, 221.1
See application file for complete search history.

(56) References Cited

U.S. PATENT DOCUMENTS

| | | | |
|---|---|---|---|
| 5,633,768 A * | 5/1997 | Watanabe | 360/99.01 |
| 5,815,645 A | 9/1998 | Fredlund | |
| 5,831,590 A * | 11/1998 | Ikedo | 345/629 |
| 5,880,740 A * | 3/1999 | Halliday et al. | 345/629 |
| 6,011,536 A | 1/2000 | Hertzmann | |
| 6,101,293 A | 8/2000 | McKenzie | |
| 6,134,392 A * | 10/2000 | Gove | 396/296 |
| 6,154,577 A | 11/2000 | Warnick | |
| 6,285,468 B1 | 9/2001 | Cok | |
| 6,317,192 B1 | 11/2001 | Silverbrook | |
| 6,483,540 B1 * | 11/2002 | Akasawa et al. | 348/239 |
| 6,543,870 B1 * | 4/2003 | Kakutani | 347/15 |
| 6,556,243 B1 * | 4/2003 | Dotsubo et al. | 348/231.2 |
| 6,671,387 B1 | 12/2003 | Chen | |
| 6,680,749 B1 * | 1/2004 | Anderson et al. | 348/231.99 |
| 6,724,913 B1 | 4/2004 | Chen | |
| 6,775,407 B1 | 8/2004 | Gindele | |
| 6,795,585 B1 | 9/2004 | Parada | |
| 6,915,273 B1 * | 7/2005 | Parulski | 705/26 |
| 7,197,698 B2 * | 3/2007 | Takata et al. | 715/201 |
| 7,263,182 B2 * | 8/2007 | Allen et al. | 379/215.01 |
| 2002/0076219 A1 * | 6/2002 | Uchino | 396/429 |
| 2004/0258308 A1 | 12/2004 | Sadovsky | |
| 2004/0263640 A1 | 12/2004 | Silverbrook | |
| 2006/0125819 A1 * | 6/2006 | Hakansson | 345/418 |

FOREIGN PATENT DOCUMENTS

JP    2005079714    3/2005

OTHER PUBLICATIONS

Japanese Patent Application 2006-127330, Office Action dated Aug. 26, 2008 & Rejection dated Jun. 16, 2009.

* cited by examiner

*Primary Examiner* — Nhan T Tran
*Assistant Examiner* — Tuan Le

(57) ABSTRACT

A user captures a digital image, which is then selected for post-processing within the image capture device. The image capture device decompresses the full size image, and buffers any metadata associated with the image. As a user applies each post-processing effect to the image, effect parameters are added to the metadata for the image. Upon completion of post-processing the effect parameters from the metadata are stored in a separate custom effect file. The image capture device then is able to perform the series of effects upon subsequent images after reading the effect parameters from the custom effect file.

20 Claims, 2 Drawing Sheets

METHOD AND APPARATUS FOR THE CREATION OF COMPOUND DIGITAL IMAGE EFFECTS

FIELD OF THE INVENTION

The present invention relates generally to the field of image capture, and more particularly to the field of accurate and easy creation of compound digital image effects.

BACKGROUND OF THE INVENTION

In the field of digital imaging, many photographers, both beginning and advanced, have a desire to make their images more personal. One method of doing this involves the use of image post-processing methods to add effects such as borders, color filters, and textures to their images. However, the application of many of these effects are typically accomplished through trial and error, and in some cases, the order in which effects are performed will be critical to the development of the final image. Users often are able to remember that they applied a number of effects to a given image, but are unable to precisely duplicate the series of effects on subsequent images.

Currently, the application of complex and powerful digital image effects requires the user to transfer raw images to a computer where (often expensive) software is used to apply the effects to their images. For users desiring to either directly couple their digital camera (or other image capture device) to a printer, there currently are only a very limited number of image effects available on camera, or within the printer firmware.

SUMMARY OF THE INVENTION

A user captures a digital image, which is then selected for post-processing within the image capture device. The image capture device decompresses the full size image, and buffers any metadata associated with the image. As a user applies each post-processing effect to the image, effect parameters are added to the metadata for the image. Upon completion of post-processing the effect parameters from the metadata are stored in a separate custom effect file. The image capture device then is able to perform the series of effects upon subsequent images after reading the effect parameters from the custom effect file.

Other aspects and advantages of the present invention will become apparent from the following detailed description, taken in conjunction with the accompanying drawings, illustrating by way of example the principles of the invention.

DETAILED DESCRIPTION

Figure 1:
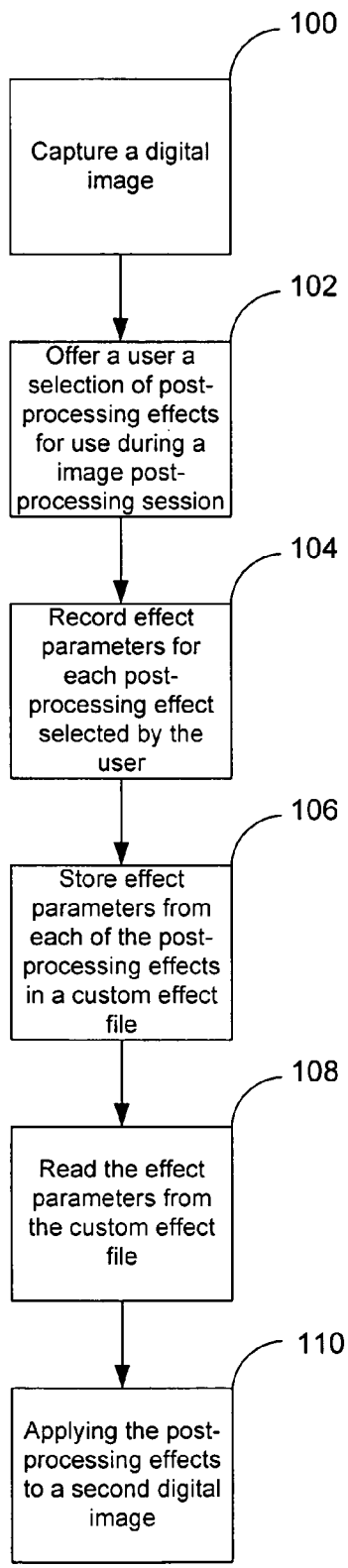
FIG. 1 is a flowchart of an example embodiment of a method for the creation of compound digital image effects according the present invention.

This description of the preferred embodiments is intended to be read in connection with the accompanying drawings, which are to be considered part of the entire written description of this invention. In the description, relative terms such as "lower," "upper," "horizontal," "vertical," "up," "down," "top," "bottom," "left," and "right" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected," "coupled," and "interconnected," refer to a relationship wherein structures are secured or attached to one another either directly or indirectly through intervening structures, as well as both movable or rigid attachments or relationships, unless expressly described otherwise.

FIG. 1 is a flowchart of an example embodiment of a method for the creation of compound digital image effects according the present invention. In a step 100, a digital image is captured. In a step 102, a user is offered a selection of post-processing effects for use during an image post-processing session. In a step 104, effect parameters are recorded for each post-processing effect selected by the user. In a step 106, the effect parameters for each post-processing effect selected by the user during a digital image post-processing session are stored in a custom effect file. In a step 108, the effect parameters are read from the custom effect file. In a step 110, post-processing effects are applied to a second digital image using the effect parameters from the custom effect file.

Examples of post-processing effects include the generation of borders for the users' digital images. In such an example effect, the effect parameters may include information such as the width of the border, the style of the border, and the color of the border. Another post-processing effect may be the overlay of a partially transparent signature or copyright to the image. In this example effect, the effect parameters may include information such as the style of the signature block, the location of an image of the signature block, the transparency of the signature block, the location of the signature block on the digital image, and the color of the signature block. Those of skill in the art will recognize that a very wide variety of digital image post-processing effects may be used within the scope of the present invention.

Other possible post-processing effects may include: creation of a texture for use with the digital image, date/time stamping, or simulation of an aged and scratched photo by the addition of scratches, muted colors, softening of the image, adjustments of brightness and contrast, and sepia coloring effects. Other post-processing effects may include: modification of the color palette (such as a reduced or modified number of colors), halftoning, pointillism (drawing and shading the entire image using dots), a pseudo-embossed or relief effect, cropping and zooming of the image, mirroring for kaleidoscoping the image, vignetting, etc.

The custom effect file must contain a list of the post-processing effects and the order in which they are applied, along with the relevant effect parameters for each of the post-processing effects. In a preferred embodiment of the present invention, the structure of the custom effect file is flexible to allow for a wide variety in the number of effect parameters used for each post-processing effect. For example, a post-processing effect that simply converts the image to a gray scale image, may not have any effect parameters, while other effects, such as the addition of a signature block, may have a large number of effect parameters. Those of skill in the art will recognize that there are a large number of file structures usable within the scope of the present invention. While some file structures may be more space efficient than others, any file structure capable of containing the necessary information will be usable within the scope of the present invention.

Figure 2A:
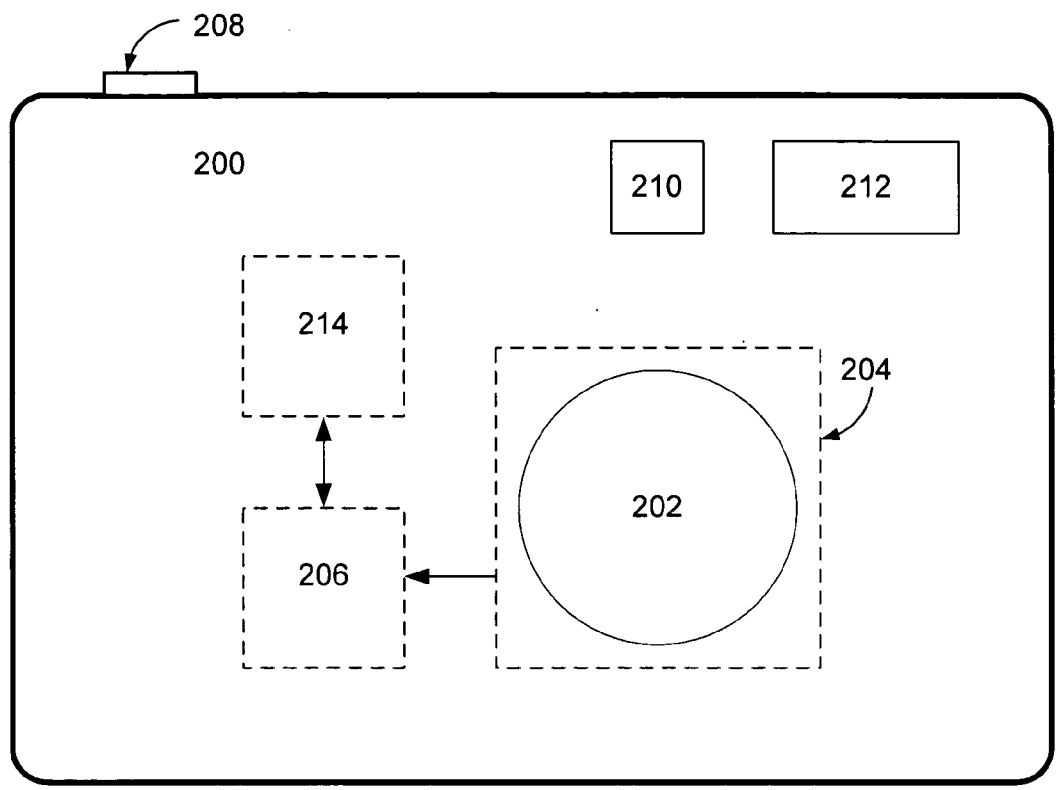
FIG. 2A is a front view of an example embodiment of an image capture device according to the present invention.

FIG. 2A is a front view of an example embodiment of an image capture device according to the present invention. In this example embodiment of the present invention, a digital camera is designed including a body 200, a lens 202, an image sensor 204 configure to sense an image projected onto it by the lens 202, a memory 206, electrically coupled with the image sensor 204 configure to store image data, image metadata and custom effect files. The digital camera also includes a processor 214 configured to apply digital multiple image post-processing effects to a first digital image, record effect parameters for each image post-processing effect used on the first digital image, and store post-processing effects and their related effect parameters in a custom effect file in the memory 206. The processor 214 is also configured to read the custom effect file from said memory 206, and apply post-processing effects to a second digital image using the post-processing effects and their related effect parameters from the custom effect file. This example digital camera also includes a shutter button 208, a viewfinder 210, and a flash 212. In some example embodiments of the present invention, some or all of the memory 206 may be non-volatile memory.

Figure 2B:
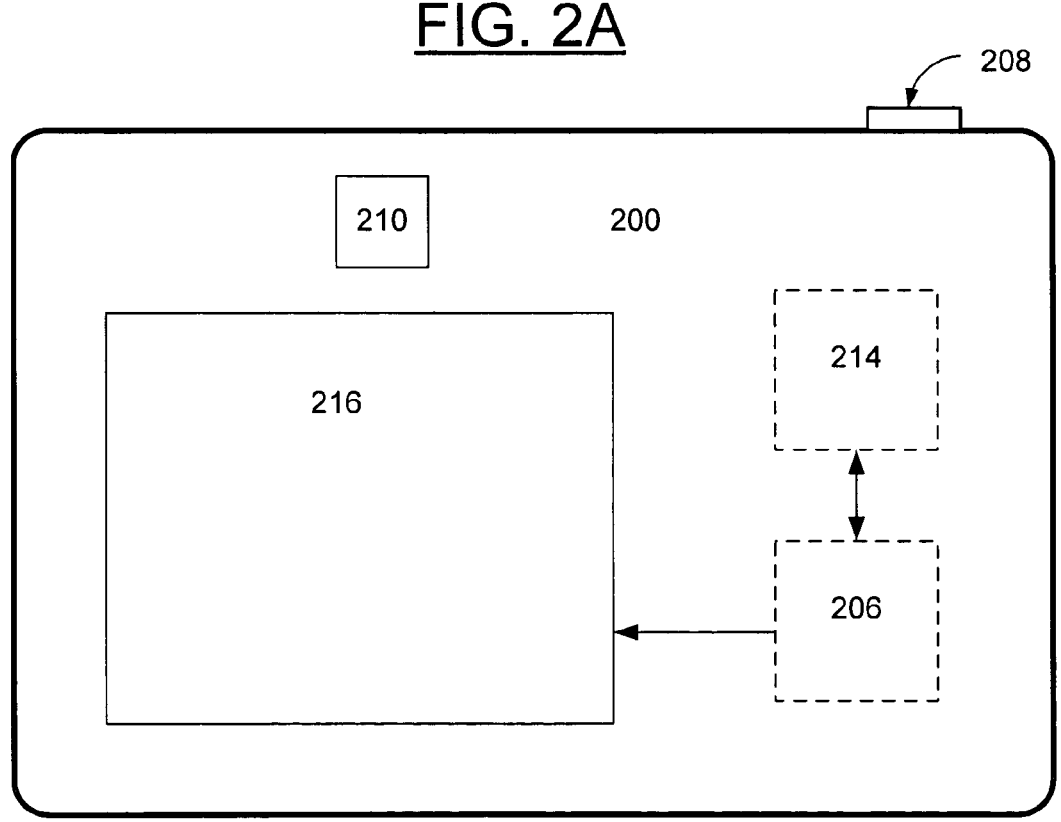
FIG. 2B is a rear view of an example embodiment of the image capture device according to the present invention from FIG. 2A.

FIG. 2B is a rear view of an example embodiment of the image capture device according to the present invention from FIG. 2A. This example digital camera also includes a display 216 (such as an LCD) electrically coupled to the memory 206 configured to display captured images and menus allowing a user to select a variety of digital imaging post-processing effects.

The foregoing description of the present invention has been presented for purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method comprising the steps of:
capturing a digital image;
offering a selection of post-processing effects for use during an image post-processing session;
recording effect parameters associated with at least two post-processing effects selected during the image post-processing session, wherein the post-processing effects are image-adjustment effects and the recording comprises adding the selected post-processing effects to metadata of the digital image;
storing in a custom effect file a list of the selected post-processing effects in an order in which the post-processing effects are applied during the image post-processing session along with the associated effect parameters added to the metadata of the digital image;
reading the effect parameters from the custom effect file; and
applying the post-processing effects and the associated effect parameters contained in the custom effect file to a subsequently captured digital image.

2. A method as recited in claim 1, wherein the post-processing effects include adding a texture to the image.

3. A method as recited in claim 1, wherein the post-processing effects include modifying the image to simulate an aged and scratched photo.

4. A method as recited in claim 1, wherein the post-processing effects include toning the image.

5. A method as recited in claim 1, wherein the post-processing effects include halftoning the image.

6. A method as recited in claim 1, wherein the post-processing effects include mirroring the image.

7. A method as recited in claim 1, wherein the post-processing effects include adjusting the image brightness.

8. A method as recited in claim 1, wherein the post-processing effects include adjusting the image contrast.

9. A method as recited in claim 1, wherein said recording effects parameters step records the effects parameters in non-volatile memory.

10. The method of claim 1, wherein the adding comprises adding the selected post-processing effects to the metadata of the digital image as the selected post-processing effects respectively are applied to the digital image.

11. An image capture device comprising:
an imaging system operable to capture digital images;
a memory configured to store the digital images, metadata of the digital images, and custom effect files; and
a processor electrically coupled with said memory, configured to perform operations comprising
offering a selection of post-processing effects for use during an image post-processing session for a particular one of the digital images,
recording effect parameters associated with at least two image post-processing effects selected during the image post-processing session and used on the particular digital image, wherein the post-processing effects are image-adjustment effects and the recording comprises adding the selected post-processing effects to metadata of the digital image;
storing in the memory a custom effect file a list of the selected post-processing effects in an order in which the post-processing effects are applied during the image post-processing session along with the associated effect parameters added to the metadata of the digital image;
reading the custom effect file from said memory; and
apply the post-processing effects and the associated effect parameters contained in the custom effect file to another one of the digital images.

12. An image capture device as recited in claim 11, wherein the post-processing effects include adding a texture to the image.

13. An image capture device as recited in claim 11, wherein the post-processing effects include modifying the image to simulate an aged and scratched photo.

14. An image capture device as recited in claim 11, wherein the post-processing effects include toning the image.

15. An image capture device as recited in claim 11, wherein the post-processing effects include halftoning the image.

16. An image capture device as recited in claim 11, wherein the post-processing effects include mirroring the image.

17. An image capture device as recited in claim 11, wherein the post-processing effects include adjusting the image brightness.

18. An image capture device as recited in claim 11, wherein the post-processing effects include adjusting the image contrast.

19. An image capture device as recited in claim 11, further comprising:

a display electrically coupled to said memory, configured to display menus allowing a user to select a variety of digital imaging post-processing effects.

20. The image capture device of claim 11, wherein the adding comprises adding the selected post-processing effects to the metadata of the particular digital image as the selected post-processing effects respectively are applied to the particular digital image.

* * * * *